3,118,851
ALKYLENE OXIDE ADDUCT OF A KETONE-FORMALDEHYDE REACTION PRODUCT, AND MIXTURE THEREOF WITH AN EPOXY RESIN
Mortimer T. Harvey, South Orange, and Peter L. Rosamilia, Newark, N.J., assignors to Harvel Research Corporation, Newark, N.J., a corporation of New Jersey
No Drawing. Filed Sept. 8, 1960, Ser. No. 54,595
7 Claims. (Cl. 260—42)

The present invention relates to novel reaction products as well as to methods for preparing them. In one of its more specific aspects the invention is directed to novel products of chemical reaction of (I) an alkylene oxide such, for example, as ethylene oxide, propylene oxide, butylene oxide, with (II) ketone-formaldehyde organic reaction products.

The products of the present invention can be further reacted with sulfuric acid or with phosphoric acid or their equivalents to produce sulfonation or phosphonation products which have general use and also the particular use of breaking emulsions such as those emulsions of water and mineral oils obtained when mineral oil is pumped from a well into storage tanks. Also, some of the products of the present invention can be used as additives to mineral oils including gasoline for detergent and anti-oxidant properties for the purpose of reducing sludging and thickening generally. The products of the present invention may be combined with epoxy resins and such combination may be cured to the substantially solid and infusible state by employing amines, polycarboxylic acids, as well as their anhydrides which act as coreactants with the epoxy resins during the curing step. Other curing agents such as boron trifluoride, complexes thereof and other strongly acidic agents may also be used as curing agents for such combinations.

By the term "epoxy resin" as employed herein I mean the polyepoxide compounds which contain reactive vicinal epoxy linkages available as reaction sites. Examples of some of such epoxy resins are the glycidyl polyethers of polyhydric phenols and/or polyhydric aliphatic alcohols produced by following the method described in U.S. Patent 2,839,481. Another class of such epoxy resins are those prepared by the direct epoxidation of aliphatic or aromatic unsaturated compounds. These resins and compositions containing these resins are classified by the U.S. Patent Office as Class 260, Sub-Class 2, 42, 47 and 348 and reference may be had thereto for the patents as well as certain publications in the field of epoxy resins. The epoxy resins which are preferably employed in the present combinations are those having a 1,2 epoxide equivalency greater than 1, and more preferably such resins which are polyglycidyl polyethers of polyhydric phenols and/or polyhydric aliphatic alcohols, examples of some of them and their methods of preparation being disclosed in the U.S. patent to D. Wasserman No. 2,891,026 of June 16, 1959, which is hereby made a part hereof.

The products of the present invention can be obtained in various degrees of solubility by the selection of the compounds which are reacted with formaldehyde and by controlling the several steps of the chemical reactions involved. As pointed out and disclosed hereinafter, various products can be obtained which are soluble in various degrees including degrees of near solubility in various solvents including water, alcohol, ketones, aromatic spirits and gasoline and other petroleum oils. Those with the near solubilities or on the edge of solubility in either oils or water are useful in breaking emulsions and for detergent and anti-oxidant purposes and those which are nearly soluble in water are useful as detergents for cleaning and washing fabrics and for cleaning the surfaces of metals, wood, plastics and so on and for increasing the wetting characteristics of certain liquid solvents and cleaning agents to facilitate the cleaning operation and to cut down the time required for cleaning.

Prior to the present invention, a variety of said reactants (II) have been known to those skilled in the art of ketone-formaldehyde organic reaction products. Said materials (II) which have been and are still known as carbonyl and methylol containing ketone-formaldehyde organic reaction products are low molecular weight, as well as increasingly higher molecular weight, organic reaction products depending upon the ketone employed, the mole proportion of the ketone to formaldehyde employed, upon whether or not the simple or monomeric ketone-formaldehyde organic reaction products are produced and/or isolated, upon whether or not the ketone-formaldehyde organic reaction products produced are self-condensation-product of said monomers and/or polymers of any of the aforesaid products or other complex organic reaction masses or products produced by carrying out said reaction under a variety of different conditions of temperature, pH, etc., all being well known to those skilled in the art. However, all of such products whether alone or in combination of two or more of them have been and are still termed ketone-formaldehyde organic reaction products and are examples of materials (II) herein, as (II) is used in the present description and claims.

In general, said materials (II) may be produced by reaction under substantially non-aqueous but preferably under aqueous conditions (a) a ketone having at least one hydrogen atom on an alpha carbon, and by "a ketone," unless otherwise specified, is meant either a single ketone or a combination of two or more ketones and (b) formaldehyde, with the mole ratio of (b) to (a) being at least one mole of (b) to one mole of (a). Said ratio is variable dependent upon the material (II) desired and the particular ketone in the reaction. In general, the mole ratio of (b) to (a) should not exceed the sum of the hydrogen atoms on the alpha carbons of the ketone employed and containing 1, 2 or 3 hydrogen atoms on such alpha carbon thereof. When acetone is the ketone employed, it is preferable to employ 2–5 moles of formaldehyde for each mole of acetone. By the term formaldehyde as employed in the present description and claims, it is meant to include formaldehyde as well as its equivalents such as paraformaldehyde, trioxane, etc. which are sometimes employed under substantially non-aqueous conditions as well as formaldehyde donors such as hexamethylene tetramine, etc. for the production of material (II).

The reaction of materials (a) and (b) in the production of materials (II) is carried out under alkaline conditions and by this is meant that the reaction is at least initiated under alkaline conditions and in some cases the reaction is then continued under pH conditions of 7 or below 7, and the materials employed to provide such alkaline conditions may vary depending upon the speed of reaction desired, the particular materials (II) desired, the temperature of reaction employed, as well as other factors known to the art. In general, the reaction, at least in its initial stage, may be carried out at a pH of at least 7.2 but preferably in the range of 7.5–14. The pH of the mass of (a) and (b) may be adjusted to the desired pH value by the addition thereto of appropriate amount of inorganic and/or organic catalysts with examples of some of them being one or a combination of two or more of the following: sodium hydroxide, potassium hydroxide, lithium hydroxide, calcium hydroxide, sodium carbonate, potassium carbonate, triethylamine, diethylamino propylamine, diethylamino triamine, triethylamino tetramine, morpholine, etc.

Specific materials (II) and methods for producing some of them employed in the practice of this invention are found in various patents and publications well known to those skilled in the art, and for the sake of illustrating only a number of them, reference is hereby made to the U.S. Patents 2,683,133 of July 6, 1954; 2,828,820 of April 1, 1958; and 2,839,481 of June 17, 1958, and in Walker, "Formaldehyde," pp. 226–229 (1953), Reinhold Publ. Corp., New York, N.Y., which disclose various ketone-formaldehyde organic reaction products produced under different conditions of reaction and employing different proportions of reactants and alkaline catalysts. All of the ketone-formaldehyde methylol and carbonyl containing organic reaction products which are disclosed in said patents and other patents and publications known to those skilled in the art and which are liquid, that is, capable of flow at a temperature no greater than and preferably less than 150° C. are those ketone-formaldehyde organic reaction products which are preferably employed as materials (II) in the practice of this invention. Examples of the ketones which are preferably employed in the production of materials (II) are acetone, diacetone alcohol, methyl ethyl ketone, mesityl oxide, methyl n-propyl ketone, methyl isopropyl ketone, methyl n-butyl ketone, methyl isobutyl ketone, cyclohexanone, isophorone, methyl n-amyl ketone, acetonyl acetone and preferably those other aliphatic ketones having a terminal methyl radical connected directly to a carbonyl group thereof.

The following Examples II–A to II–E are given by way of illustrating specific methods for producing certain materials (II), with all parts being given by weight unless otherwise specified, it being understood that such examples are given by way of illustration and not by limitation.

EXAMPLE II–A

[1 mole acetone : 2 moles of $CH_2O$]

Into a vessel which is closed except for an opening into a reflux condenser, 60 parts of acetone, 340 parts of a commercial water solution of formaldehyde (about 37%) and 3 parts of triethylamine are loaded and heat is applied. When the temperature reaches about 135° F. the heating is discontinued. An exothermic reaction takes place, following which and when the temperature begins to drop, an additional 60 parts of acetone and 3 parts of triethylamine are added. Upon making this addition, an exothermic reaction takes place again after which heat is again applied to maintain a refluxing temperature for ½ hour. Then the mass is substantially completely dehydrated under vacuum of 10–15 mm. of mercury pressure to a temperature of 150° F., is strained and collected and is an acetone-formaldehyde reaction product liquid at 150° F. and is known hereinafter as product II–A.

EXAMPLE II–B

[1 mole acetone : 2 moles of $CH_2O$]

The steps of making this product are similar to those in Example II–A above except that the first charge of reactants comprises 60 parts of acetone, 340 parts of commercial water solution of formaldehyde (about 37%) and 2 parts of diethylamino propylamine. The second charge comprises 60 parts of acetone and 2 parts of the diethylamino propylamine. The resultant substantially completely dehydrated acetone-formaldehyde reaction product is liquid at 150° F. and is hereinafter known as product II–B.

EXAMPLE II–C

[1 mole acetone : 4 moles $CH_2O$]

Into a reaction vessel having a high speed stirrer, a reflux condenser and a jacket for the circulation of heating or of cooling materials, there is loaded about 375 parts of acetone and about 2135 parts of commercial water solution of formaldehyde (about 37%). Separately, 31¼ parts of sodium hydroxide are dissolved in 75 parts of water. 22 parts of the sodium hydroxide-water solution are added cautiously to the reaction vessel with the stirrer in motion. A small amount of steam is admitted to the jacket and the temperature of the reaction mass being carefully watched, is brought up to about 115° F. at which point the steam is shut off and cold water is turned into the jacket. Through exothermic reaction, the temperature will rise and by cooling with the water, the temperature is maintained between 175° F. and 200° F. When the temperature drops to about 160° F., 16 more parts of the sodium hydroxide-water solution are added after which the temperature will rise about 10 to 20 degrees. When the temperature drops again to about 160° F., the sodium hydroxide-water solution in like manner is again added in increments of not more than 16 parts until it has all been added, after which the reaction mass is refluxed at about 185° F. for ½ hour. The reaction mass is then substantially completely dehydrated as in Example II–A to provide an acetone-formaldehyde organic reaction product liquid at 150° F. and is known hereinafter as product II–C.

EXAMPLE II–D

[1 mole methyl ethyl ketone : 1 mole $CH_2O$]

Into a reactor, having a jacket with steam connection and cooling water connection, a high speed stirrer, a reflux condenser and connection to a vacuum pump, are added 360 parts of methyl ethyl ketone and 400 parts of commercial water solution of formaldehyde (about 37%), the connection to the vacuum pump being closed and connection to the condenser being open. A solution of 25 parts of sodium hydroxide and 60 parts of water is prepared. The high speed stirrer is set in motion and about 20 parts of the sodium-hydroxide-water solution is added slowly into the reagents in the reactor. Steam is admitted to the reactor jacket and the temperature of the reaction mass is brought to about 125° F. at which point the steam is shut off from the jacket. Exothermic reaction will take place between the methyl ethyl ketone and the formaldehyde, under the conditions stated and the temperature will tend to rise about 125 degrees. When the temperature of the reaction mass commences to rise, cooling water is admitted to the jacket and the reaction temperature is controlled and permitted to rise gradually to about 200° F. at which point it is maintained until the exothermic reaction commences to subside and the temperature to fall. At about 180° F. a second portion of about 25 parts of the sodium hydroxide-water solution was added and the temperature was permitted to rise again to about 200° F. This procedure is repeated until all of the 85 parts of sodium hydroxide-water solution has been added, the flow of cooling water being maintained and when the temperature has fallen to about 155° F. after the last addition of sodium hydroxide-water solution, connection to the condenser is closed and the connection to the vacuum pump is opened, the cooling water is shut off and steam is admitted to the jacket. The reaction mass is substantially completely dehydrated at about 150° F. under a pressure of 10–15 mm. of mercury to provide a methyl ethyl ketone-formaldehyde reaction product liquid at 150° F. and hereinafter known as product II–D.

EXAMPLE II–E

Employing the same procedure and components as those of Example II–A, except that for the 60 parts of acetone there is substituted 100 parts of methyl isopropyl ketone, there is obtained a methyl isopropyl ketone-formaldehyde reaction product which is liquid at 200° F. and is hereinafter known as product II–E.

Other illustrative examples of other materials (II) are the following:

The dehydrated organic reaction product described as a light colored, low viscosity resinous liquid measuring 247 parts in Example A–V of U.S. Patent 2,839,481 is a methyl isobutyl ketone-formaldehyde reaction product and is known herein as product II–F.

Product A–VI of U.S. Patent 2,839,481 which is liquid at 250° F. is a cyclohexanone-formaldehyde organic reaction product known herein as product II–G.

Product A–VIII of U.S. Patent 2,839,481 which is liquid at 200° F. is an acetonyl acetone-formaldehyde organic reaction product and is known herein as product II–H.

Products A–XIX, A–XX and A–XXIV of Examples A–XIX, A–XX and A–XXIV of U.S. Patent 2,839,481 are liquid diacetone alcohol-formaldehyde, mesityl oxide-formaldehyde and isophorone-formaldehyde organic reaction products respectively and are known herein respectively as products II–I, II–J and II–K.

The aqueous solution of acetone-formaldehyde organic reaction products having viscosity of 2300, 3000 and 7000, produced as described in U.S. Patent 2,859,192 and identified therein as products 1A, 2A and 3A respectively, were dehydrated under pressure of 10–15 mm. of mercury while being heated to 150° F. thereby to provide acetone-formaldehyde organic reaction products, liquid at 200° F. and known herein as products II–L, II–M and II–N respectively.

The foregoing products II–A to II–N are only some of the specific materials (II) which may be reacted with materials (I) in the practice of this invention.

Materials (I) may be reacted with materials (II) either in the presence or absence of a catalyst for promoting reaction. The catalysts preferably employed are alkaline catalysts such as NaOH, KOH, $Ca(OH)_2$, sodium ethylate, sodium methylate, etc. The ratio by weight of material (II) reacted with material (I) may vary depending upon the amount of alkylene oxide to be reacted therewith, upon the molecular weight of the ketone-formaldehyde organic reaction product subjected to such reaction and also upon the number of methylol groups per molecule or other unit of material (II). In general the ratio by weight of material (I) to material (II) is in the range of about 10 parts by weight of material (I) to 1–100 parts by weight of material (II).

The following Examples 1 to 18 are given by way of illustrating some of the novel products of this invention as well as some of the methods for preparing them, all parts being given by weight unless otherwise specified, such examples being given by way of illustration and not by limitation.

*Example 1*

100 parts of product II–A and 100 parts of ethylene oxide are heated together in a closed autoclave until the pressure therein is 100 lbs. per sq. in. and said condition is maintained over a period of about 2 hours. The source of heat is removed and the pressure is reduced to atmospheric and the mass is heated under atmospheric pressure conditions to about 300° F. whereupon the removal of volatiles, such as water and unreacted ethylene oxide is effected. The resultant reaction mass weighed about 130 parts indicating that only about 30% of the original quantity of the ethylene oxide had reacted with product II–A, and said resultant reaction mass is essentially product II–A-ethylene oxide organic reaction product and is hereinafter known as novel product 1, an illustrative embodiment of this invention.

*Example 1–a*

If desired, 130 parts of said novel product 1 is placed in the autoclave together with 50 parts of ethylene oxide and 2 parts of sodium ethylate. The autoclave is closed and heated until the mass therein is at a pressure of about 100 lbs. per sq. in. and said condition is maintained over a period of about 2 hours. The source of heat is removed, the pressure is reduced to atmospheric and the resultant mass is heated under atmospheric pressure conditions to about 300° F. whereby the removal of volatiles such as water and ethylene oxide is effected. The resultant reaction mass weighed approximately 140 parts indicating that about 10 parts of ethylene oxide had reacted with product 1 and said resultant reaction mass is hereinafter known as product 1–a.

*Examples 2–6*

Employing the same procedure and components as those set forth in Example 1, but substituting products II–B, II–C and II–L, II–M and II–N for product II–A thereof, there are produced ethylene oxide reaction products of said respective product II–B, II–C, II–L, II–M and II–N, which reaction products are hereinafter known as novel products 2, 3, 4, 5 and 6. Said novel reaction products 2–6 respectively may be subjected to the same procedure as product 1 in Example 1–a to provide other novel products 2–a, 3–a, 4–a, 5–a and 6–a respectively all of which novel products are additional embodiments of the present invention.

*Example 7*

100 parts of product II–D, 100 parts of ethylene oxide and 5 parts of sodium methylate are charged into an autoclave which is subsequently closed and heated until the pressure of the mass therein is about 80 lbs. per sq. in. This condition is maintained for a period of about 15 minutes after which the heat is discontinued and the mass in the autoclave is permitted to cool to room temperature. Heat is again applied until the pressure of the mass in the autoclave is about 100 lbs. per sq. in. and this condition is maintained for a period of 15 minutes after which heat is discontinued and the mass in the autoclave is permitted to cool to room temperature. Again heat is applied until the pressure of the mass in the autoclave is increased to approximately 100 lbs. per sq. in. and this condition is maintained for 3 hours. The source of heat is removed and the mass in the autoclave is allowed to cool to room temperature after which said mass is removed therefrom and also subsequently is heated under atmospheric conditions to 220° F. whereby removal of volatiles such as ethylene oxide and water is effected. The resultant reaction mass weighed about 150 parts indicating that about 50% of the original quantity of ethylene oxide had reacted with product II–D and said resultant reaction mass is essentially product II–D-ethylene oxide organic reaction product which is substantially insoluble in water and is hereinafter known as novel product 7 and is also an illustrative embodiment of the present invention.

*Example 8*

100 parts of product II–D is combined with 1 part of a 20% aqueous solution of sodium hydroxide. This mass is heated under subatmospheric conditions of about 10–15 mm. of mercury pressure up to a temperature of approximately 100° C. to remove the water therefrom. Then while at a temperature of 100° C., ethylene oxide was gradually added thereto and the temperature thereof increased to approximately 150–160° C. until 50 parts of ethylene oxide had chemically combined with product II–D. The pH of the resultant mass was adjusted to 7 and then the mass was heated under subatmospheric pressure of 10–15 mm. of mercury pressure at 100° C. to effect the removal of water and other volatiles. The resultant reaction mass weighed about 150 parts and is essentially product II–D-ethylene oxide organic reaction product which is capable of flow at room temperature and which is hereinafter known as novel product 8.

Instead of terminating the reaction after the addition of only 50 parts of ethylene oxide, the ethylene oxide addition may be continued under the aforesaid conditions of 150–160° C. under atmospheric pressure until about 220 parts of ethylene oxide has chemically reacted with said 100 parts of said product II–D. The resultant mass is subjected to heat under sub-atmospheric conditions to drive off water and other volatiles and the resultant reaction mass consists essentially of an ethylene oxide reaction product of product II–D, measures approximately 300 parts and is water soluble or water dispersible and is hereinafter known as product 8–a and is still another embodiment of the present invention.

Example 9

Employing the same procedure and components as those set forth in Example 8, except that for the 100 parts of product II-D there is employed 100 parts of product II-F, there is produced an ethylene oxide reaction product of product II-F known hereinafter as novel product 9 and may be further reacted to produce novel product 9-a.

Example 10

Following the same procedure and components as those set forth in Example 1, except that for the 100 parts of product II-A there is employed 100 parts of product II-E there is produced a reaction mass weighing about 125 parts indicating that only about 25% of the original quantity of ethylene oxide had reacted with product II-E. Said resultant reaction mass is essentially product II-E-ethylene oxide organic reaction product and is hereinafter known as novel product 10, still another illustrative embodiment of the present invention.

Examples 11–15

Employing the same procedure and components as those set forth in Example 1 except for the 100 parts of product II-A there is employed 100 parts of product II-G, II-H, II-I, II-J and II-K respectively, there are produced reaction masses consisting essentially of ethylene oxide-product II-G, ethylene oxide-product II-H, ethylene oxide-product II-I, ethylene oxide-product II-J and ethylene oxide-product II-K respectively and are hereinafter known respectively as novel products 11–15, being further illustrative embodiments of the present invention.

Examples 16 and 17

Employing the same procedure and components as those set forth in Example 1 except that for the 100 parts of product II-A there are employed respectively 100 parts of product II-E and product II-F and for the 100 parts of ethylene oxide there are employed 75 parts of propylene oxide whereby there are produced respective resultant organic reaction masses consisting essentially of propylene oxide-product II-E and propylene oxide-product II-F which are known hereinafter as respective product 16 and product 17, also being illustrative embodiments of the present invention.

Example 18

Employing the same procedure and components as those set forth in Example 7 except that for the 100 parts of product II-D there is employed 100 parts of product II-I and for the 190 parts of ethylene oxide there is employed 400 parts of ethylene oxide whereby there is produced a resultant reaction mass which is substantially water soluble and is hereinafter known as product 18, being still another illustrative embodiment of the present invention.

The products of the present invention are ether derivatives of materials (II) in which the hydrogen atom of one or more hydroxy groups thereof have been substituted by $(R-O)_n-H$, wherein R is an alkylene group and $n$ is at least 1 and is preferably 1–5 but may be even higher, up to 10 if desired by increasing the proportion of material (I) to material (II), illustrative examples of which are the novel products in the previous examples, which find application in a number of different fields as hereinbefore set forth. In addition, they may be reacted with organic acids and with esters of organic acids to esterify the same. For example, acrylic acid may be reacted with said novel reaction products of the present invention in the proportionate amounts of 1 molecular weight of acrylic acid for each hydroxyl group in a predetermined unit amount of novel reaction product employed as a reactant thereby to produce the acrylate thereof. It is to be understood, of course, that the proportion of such acid to be employed may be varied depending upon the degree of esterification desired.

All of said novel product of this invention, some examples of which are all of those in the foregoing examples, may be combined with various epoxy resins in the proportions of 100 parts of the former to 10–100 parts of the latter, all parts by weight and such combination may be cured by employing an amine capable of curing the epoxy resin employed and/or a polybasic carboxylic acid or anhydride thereof of the same characteristics. Some of the specific curing agents which may be used are all of the compounds set forth in lines 20–48 of col. 2 of U.S. patent to D. Wasserman, 2,900,364 of August 18, 1959, made part hereof. The presence of such novel product in such combinations in some cases, if they are of low viscosity, act to provide an epoxy containing liquid of lower viscosity than the epoxy resin employed. In addition, the presence of such novel reaction products therein decreases the cost of the ultimate product produced without lowering the alkali, acid or solvent resistance thereof and moreover when such combinations are laid onto the surface of a material such as steel or aluminum and subsequently cured thereon, improved adhesion is effected.

The following are specific examples of some of the specific combinations of epoxy resins with specific novel products described herein.

100 parts of product I-E of the U.S. patent to D. Wasserman 2,665,266 which is the glycidyl polyether of a reaction product of hydroxy benzene and cashew nut shell liquid and 100 parts of product 1 of Example 1 herein are mixed together and then there is added thereto 10 parts of diethylene triamine which is quickly stirred therein and the mass is poured directly into a container containing an electrical component to be encapsulated. Heat is applied whereupon said mass is converted to the substantially solid and infusible state to provide said electrical component with a substantially solid encapsulant. Instead of employing the diethylene triamine, 40 parts of phthalic anhydride may have been substituted therefor.

If desired, for the product I-E of the Wasserman Patent 2,665,266 there may be substituted an equivalent amount of "Shell Epon 162" which is a normally liquid glycidyl polyether of glycerine, or other "Epon" resins such as glycidyl polyether of 5-pentadecyl resorcinol which has a melting point of 19–23° C., or various other epoxy resins such as the glycidyl polyether of 2,2-bis, para-hydroxy phenyl propane, known on the market as "Shell Epon 828", "Shell Epon 864", "Shell Epon 1001", etc. When the epoxy resin employed is normally solid, it is preferable, of course, that the combination of such epoxy resin and one of the novel products of this invention in combination therewith be first heated together and then the curing agent is added thereto.

Such novel products of this invention may be combined with various epoxy resins and then either with or without first having been thinned with an organic solvent, may have the polybasic curing agent, such as pyromellitic acid dianhydride, added thereto and such combination may be spread as a thin film on the material to be coated. Such coated material is then placed in an oven and allowed to remain therein for a period up to 24 hours at 350° F. whereupon the film is converted to the substantially solid and infusible state.

Another one of the uses of the novel products of this invention is to combine 100 parts thereof with 35 parts of maleic or phthalic anhydride, for example, and such combination is heated to approximately 80° C. and while at this temperature it may be spread as a coating on a material such as metal or the like to be protected and such coating material is then baked at approximately 350° F. for 24 hours whereupon the coating is converted to the substantially solid and infusible state.

When the epoxy resin employed and one of the novel products herein is combined therewith and both are liquid at room temperature, such combinations are usually "cold setting" when an amount of diethylene triamine or triethylene tetramine equal to about 10% by weight of the combination is uniformly distributed therethrough and consequently finds use as an adhesive, bonding agent and as a floor patching material.

The novel products of this invention also find application as coating materials in the absence of any epoxy or other resins. They may be combined with 10% by weight of diethylene triamine or triethylene tetramine or with 35% by weight of phthalic anhydride and such combinations may be reacted by the application of heat to provide intermediate products, or they may be employed as a coating material on glass cloth, sheet aluminum, sheet ferrous metals, etc., which are then baked in an oven for 24 hours at 350° F. to convert the coating to a continuous protective thin film.

Those novel products of this invention which are water soluble, such as novel product 8-a, 9-a and 18, for example, may be added to aqueous emulsions of polyvinyl alcohol and polyvinyl acetate respectively in amounts of 5 to 30 parts of the former to 100 parts of the latter. The components are mixed together for uniform distribution and then such combination may be applied as thin films onto paper or the like which is then baked in an oven at 250° F. for one to two hours thereby to provide a coating or sizing therefor.

This application is a continuation-in-part of our co-pending application Serial No. 566,084, filed February 17, 1956, now abandoned.

We claim:
1. An alkylene oxide adduct of (A) carbonyl and methylol containing ketone-formaldehyde organic reaction product, said (A) being liquid at 150° C., the ratio by weight of said (A) to said alkylene oxide being in the range of 1–100 parts by weight of (A) to 10 parts by weight of said alkylene oxide.

2. An adduct defined in claim 1, with the alkylene oxide being ethylene oxide.

3. An adduct defined in claim 1 with the ketone being acetone.

4. An adduct defined in claim 1 with the ketone being methyl isobutyl ketone.

5. An adduct defined in claim 1 with the ketone being isopropyl ketone.

6. A novel composition of matter comprising (1) a polyglycidyl ether of a compound selected from the group consisting of polyhydric phenols and polyhydric aliphatic alcohols and (2) an adduct as defined in claim 1, said (1) having an average 1,2 epoxy equivalency greater than 1.

7. A composition defined in claim 6, cured to the substantially solid and infusible state in the presence of a curing agent therefor.

References Cited in the file of this patent
UNITED STATES PATENTS
2,839,481     Harvey et al. _____ June 17, 1958
FOREIGN PATENTS
850,233     Germany _____ Sept. 22, 1952